United States Patent
Nagel et al.

(10) Patent No.: US 10,425,376 B2
(45) Date of Patent: Sep. 24, 2019

(54) INSTALL MODE AND CLOUD LEARNING FOR SMART WINDOWS

(71) Applicant: Kinestral Technologies, Inc., Hayward, CA (US)

(72) Inventors: Paul Nagel, Hayward, CA (US); Wally Barnum, Hayward, CA (US); Stephen Coffin, Hayward, CA (US); Brandon Nichols, Hayward, CA (US); Ashish Nagar, Hayward, CA (US); Kamil Bojanczik, Hayward, CA (US); Jonathan Ziebarth, Hayward, CA (US)

(73) Assignee: Kinestral Technologies, Inc., Hayward, CA (US)

( * ) Notice: Subject to any disclaimer, the term of this patent is extended or adjusted under 35 U.S.C. 154(b) by 4 days.

(21) Appl. No.: 14/821,366

(22) Filed: Aug. 7, 2015

(65) Prior Publication Data
US 2016/0203403 A1 Jul. 14, 2016

Related U.S. Application Data

(60) Provisional application No. 62/102,508, filed on Jan. 12, 2015, provisional application No. 62/102,504, (Continued)

(51) Int. Cl.
*G06N 7/00* (2006.01)
*H04L 12/58* (2006.01)

(52) U.S. Cl.
CPC ............. *H04L 51/32* (2013.01); *G06N 7/005* (2013.01)

(58) Field of Classification Search
CPC .................................................... G06N 7/005
(Continued)

(56) References Cited

U.S. PATENT DOCUMENTS 6,614,577 B1 * 9/2003 Yu ................. G02F 1/163
351/44
7,610,910 B2 11/2009 Ahmed
(Continued)

FOREIGN PATENT DOCUMENTS

WO WO2013061189 A1 5/2013

OTHER PUBLICATIONS

Mardaljevic et al ("Electrochromic glazing and facade photovoltaic panels: a strategic assessment of the potential energy benefits" 2008).*
(Continued)

*Primary Examiner* — Lut Wong
(74) *Attorney, Agent, or Firm* — Womble Bond Dickinson (US) LLP

(57) ABSTRACT

A cloud learning system for smart windows is provided. The system includes at least one server configured to couple via a network to a plurality of window systems, each of the plurality of window systems having at least one control system and a plurality of windows with electrochromic windows and sensors, wherein the at least one server includes at least one physical server or at least one virtual server implemented using physical computing resources. The at least one server is configured to gather first information from the plurality of window systems, and configured to gather second information from sources on the network and external to the plurality of window systems. The at least one server is configured to form at least one rule or control algorithm usable by a window system, based on the first information and the second information, and configured to download the at least one rule or control algorithm to at least one of the plurality of window systems.

12 Claims, 11 Drawing Sheets

Related U.S. Application Data filed on Jan. 12, 2015, provisional application No. 62/102,515, filed on Jan. 12, 2015, provisional application No. 62/102,516, filed on Jan. 12, 2015.

(58) Field of Classification Search
USPC .......................................................... 706/61
See application file for complete search history.

(56) References Cited

U.S. PATENT DOCUMENTS

| | | |
|---|---|---|
| 8,719,847 B2 | 5/2014 | Saroiu |
| 8,755,394 B2 | 6/2014 | Kaluskar |
| 8,761,050 B2 | 6/2014 | Lu et al. |
| 8,836,470 B2 | 9/2014 | Anderson |
| 8,892,262 B2 | 11/2014 | Rodriguez |
| 9,128,346 B2 | 9/2015 | Shrivastava et al. |
| 2011/0066302 A1 | 3/2011 | McEwan |
| 2013/0242370 A1 | 9/2013 | Wang |
| 2013/0271814 A1 | 10/2013 | Brown |
| 2014/0001977 A1 | 1/2014 | Zacharchuk et al. |
| 2014/0012981 A1 | 1/2014 | Samuell et al. |
| 2014/0028448 A1 | 1/2014 | Karam |
| 2014/0236323 A1* | 8/2014 | Brown .................. G02F 1/163 700/90 |
| 2014/0268287 A1 | 9/2014 | Brown et al. |
| 2015/0116811 A1 | 4/2015 | Shrivastava et al. |

OTHER PUBLICATIONS

Kotsopoulos, Developing a RESTful communication protocol and an energy optimization . . . Google Scholar, p. 1, p. 3-4, ICST.

Roe, Information Storm: An Assesment of Responsive Facades . . . , Google Scholar, p. 916, 919, 920, 921, Open Systems: Proceedings of the 18th International Conference . . . .

Carbone, From Smart House to Networked Home, Dow Jones Factiva, Sec."10 Technology Trajectories" and 3rd paragraph at end of article, Futurist (IACA 29), vol. 46, Issue 4.

Oliveira, End-to-End Connectivity IPv6 over Wireless Sensor Networks, IEEE Xplore, Figs. 2, 3 and section II.C., Ubiquitous and Future Networks vol., No., pp. 1,6, 15-17.

International Search Report, PCT/US2016/013089, dated Mar. 24, 2016.

* cited by examiner

INSTALL MODE AND CLOUD LEARNING FOR SMART WINDOWS

BACKGROUND

Electrochromic devices, in which optical transmissivity is electrically controlled, are in current usage in building windows and in dimmable automotive rearview mirrors. Generally, electrochromic windows for a building are controlled with a driver and a user input, e.g., a dimmer control. Electrochromic rearview mirrors in automotive usage often have a light sensor aimed to detect light from headlights of automobiles, and are user-settable to engage an auto-dim function that adjusts the tint of the mirror based on input from the light sensor. There is a need in the art for a control system for electrochromic devices which goes beyond such basic settings and functions.

SUMMARY

In some embodiments, a cloud learning system for smart windows is provided. The system includes at least one server configured to couple via a network to a plurality of window systems, each of the plurality of window systems having at least one control system and a plurality of windows with electrochromic windows and sensors, wherein the at least one server includes at least one physical server or at least one virtual server implemented using physical computing resources. The at least one server is configured to gather first information from the plurality of window systems, and configured to gather second information from sources on the network and external to the plurality of window systems. The at least one server is configured to form at least one rule or control algorithm usable by a window system, based on the first information and the second information, and configured to download the at least one rule or control algorithm to at least one of the plurality of window systems.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A smart window system, disclosed herein, has a distributed device network control system architecture that can distribute control of optical transmissivity of smart windows across the smart windows, intelligent window controller/drivers, a command and communication device, and one or more resources on a network. A smart window within such a system can be defined as a window with some local and/or external or remote computer processing capabilities and which is connectable to the internet. In some embodiments the window is an electrochromic window but this is not meant to be limiting as non-electrochromic windows may be smart windows as described herein. Electrochromic and non-electrochromic windows may be integrated into the same system in some embodiments. The smart window may function as a glass partition in some embodiments and be within an interior of a structure rather than have one surface facing an exterior in some embodiments. The smart window system combines input from sensors integrated with the smart windows, user input, and information and direction from the network to control the smart windows in an interactive, adaptive manner. Control can shift from one component to another, be shared across multiple components, or be overridden by one component of the system, in various embodiments. The distributed nature of the architecture and the control support various system behaviors and capabilities. Aspects of the smart window system and distributed device network control system architecture are described herein with reference to FIGS. 1-5. Aspects of installation of the smart window system, and cloud learning are described herein with reference to FIGS. 6-14.

Figure 1:
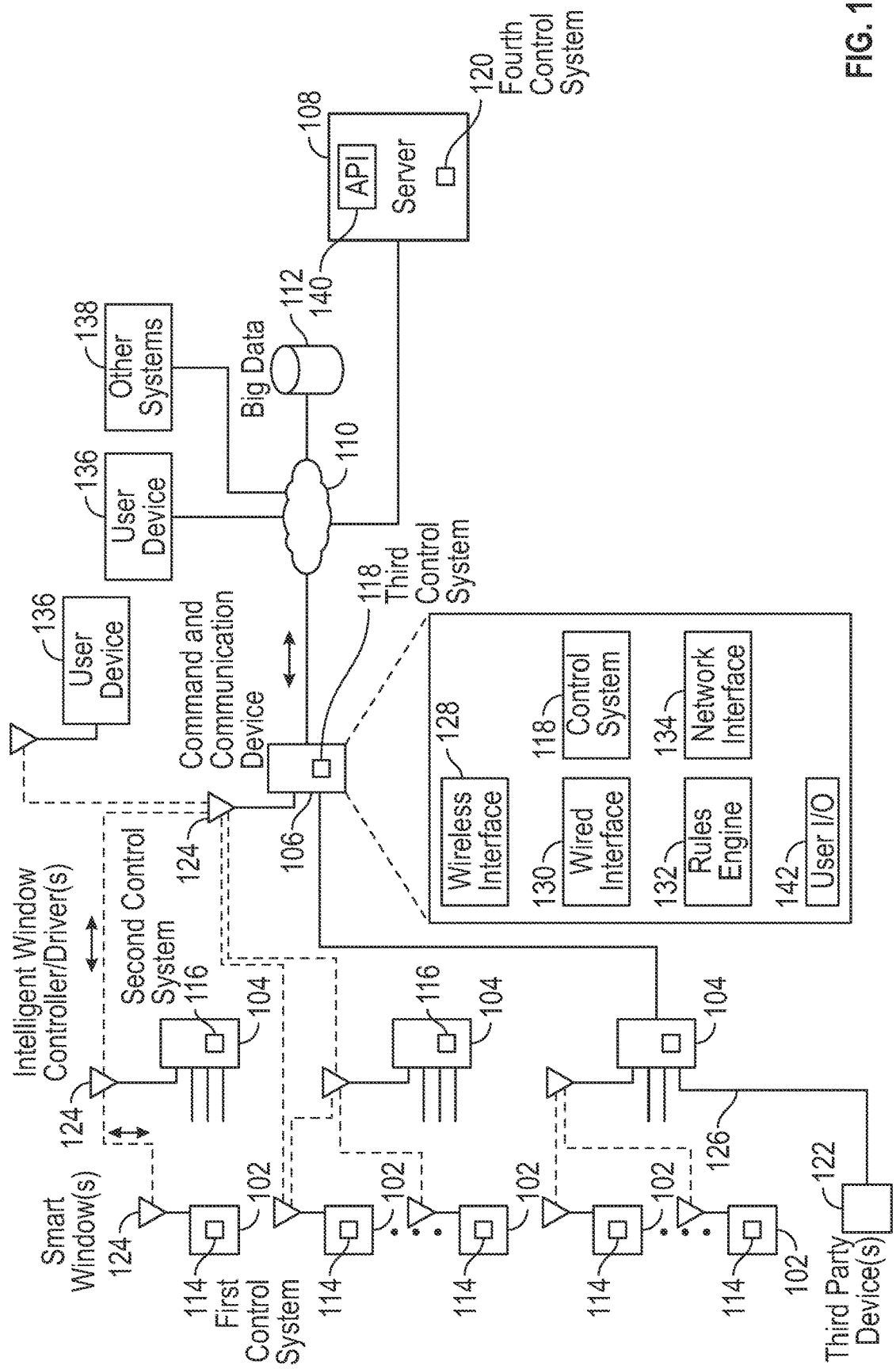
FIG. 1 is a system diagram of a smart window system that has a distributed device network control system architecture in accordance with some embodiments.

FIG. 1 is a system diagram of a smart window system that has a distributed device network control system architecture in accordance with an embodiment of the present disclosure. The system is both modular and distributed, and is suitable for installation in various living, working or commercial spaces, such as an apartment, house, an office, a building, a store, a mall, etc. Modularity allows for replacement of individual components, upgrades, expansion, linking of two or more systems, and communication in the system and among multiple systems. Wireless couplings, wired couplings, and combinations thereof are supported by the smart window system. Although antennas 124 are shown for the wireless coupling, further embodiments could use infrared coupling.

Control is distributed across one or more first control systems 114, with one in each smart window 102, one or more second control systems 116, with one in each intelligent window controller/driver 104, a third control system 118 in a command and communication device 106, and a fourth control system 120 in a server 108 coupled to a network 110. Each smart window 102 has an antenna 124 and is thereby wirelessly connected to a nearby intelligent window controller/driver 104, also with an antenna 124. In further embodiments, a wired connection could be used. Each intelligent window controller/driver 104 is wirelessly connected to the command and communication device 106, which has an antenna 124. In further embodiments, a wired connection could be used. The command and communication device 106 is coupled to a network 110, such as the global communication network known as the Internet. This coupling could be made via a wireless router (e.g., in a home, office, business or building), or a wired network connection. User devices 136 (e.g., smart phones, computers, various computing and/or communication devices) can couple to the command and communication device 106, for example by a direct wireless connection or via the network 110, or can couple to the server 108 via the network 110, as can other systems 138 and big data 112. In some embodiments, the server 108 hosts an application programming interface 140. The server 108 could be implemented in or include, e.g., one or more physical servers, or one or more virtual servers implemented with physical computing resources, or combinations thereof.

Modularity of the system supports numerous layouts and installations. For example, each windowed room in a building could have one or more smart windows 102 and a single intelligent window controller/driver 104 for that room. An intelligent window controller/driver 104 could control smart windows 102 in part of a room, an entire room, or multiple rooms. The intelligent window controller/driver(s) 104 for that floor of the building, or for a portion of or the entire building in some embodiments, could tie into a single command and communication device 106, which is coupled to the network 110 and thereby coupled to the server 108. In a small installation, one or more smart windows 102 could couple to a single intelligent window controller/driver 104 for local distributed control, or a single command and communication device 106 for both local and network distributed control. Or, an intelligent window controller/driver 104 could be combined with the command and communication device 106, in a further embodiment for small systems that use both local control and network information. Large systems, e.g., for multiple occupant buildings, could have multiple command and communication devices 106, e.g., one for each occupant or set of occupants, or each floor or level in the building, etc. Upgrades or expansions are readily accommodated by the addition of further components according to the situation.

In one embodiment as shown in FIG. 1, the command and communication device 106 has a wireless interface 128, a wired interface 130, a control system 118, a rules engine 132, a network interface 134, and a user I/O (input/output) module 142. The wireless interface 128 and/or the wired interface 130 are used for coupling to the intelligent window controller/driver(s) 104. The network interface 134 is used for connecting to the network 110. For example, the network interface 134 could connect to a wireless router or Wi-Fi, e.g., via the wireless interface 128, or to a wired network via the wired interface 130. In some embodiments, the wireless interface 128 and/or the wired interface 130 can couple to third-party devices for sensing, input and/or output (see, e.g., description regarding FIG. 3). The rules engine 132 uses information from the network 110, which can include direction from the fourth control system 120 in the server 108, and can include information from user devices 136, other systems 138, or big data 112, to create, populate, modify, or adapt various rules for operation of the smart windows 102. The user I/O module 142 accepts user input, e.g., via buttons, a touchscreen, etc., and displays user output, e.g., via a display screen or with LEDs or other lamps, etc. Some embodiments may lack the user I/O module 142, or have a user input module or an output module. In keeping with the nature of this distributed control system, the third control system 118 of the command and communication device 106 can direct operation of the smart windows 102, the second control system 116 of the intelligent window controller/driver(s) 104 can direct operation of the smart windows 102, the fourth control system 120 of the server 108 can direct operation of the smart windows 102, and/or the first control system 114 of each smart window 102 can direct operation of that smart window 102, in various combinations. Some embodiments have a failover mechanism, in which control and/or communication are routed around a failed device in the system.

As shown by the dashed lines, communication can proceed amongst various members of the smart window system over various paths, in various embodiments. In some embodiments, a message or other communication is passed along a chain, such as from a smart window 102, to an intelligent window controller/driver 104, or via the intelligent window controller/driver 104 to the command and communication device 106, and vice versa. In some embodiments, a device can be bypassed, either by direct communication between two devices or by a device acting as a relay. For example, a smart window 102 could communicate directly with a command and communication device 124 wirelessly via the wireless interface 128 or via the wired interface 130. Or, an intelligent window controller/driver 104 could relay a message or other communication, as could the command and communication device 106. In some embodiments, messages or communications can be addressed to any component or device in the system, or broadcast to multiple devices, etc. This could be accomplished using packets for communication, and in some embodiments any of the control systems 114, 116, 118, 120 can communicate with the cloud, e.g., the network 110.

Figure 2:
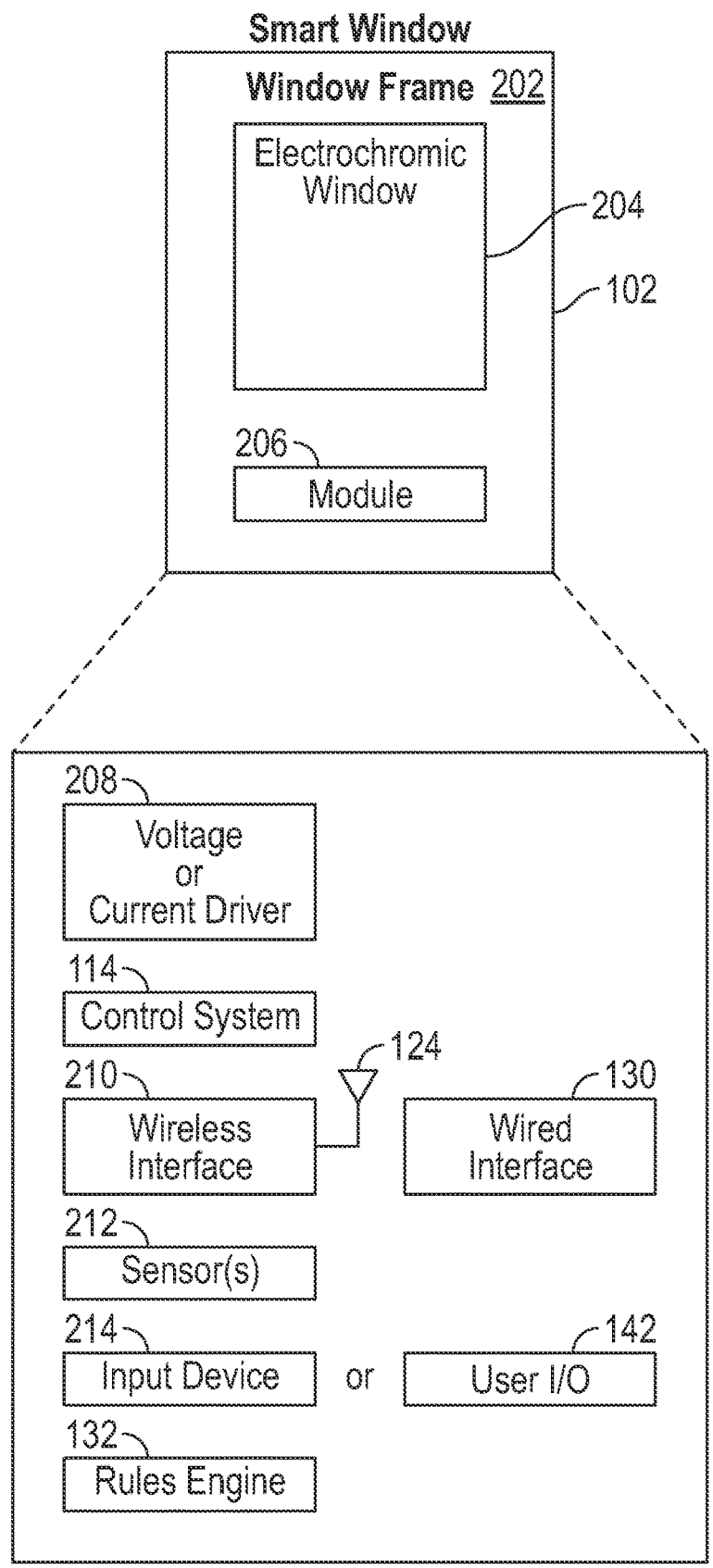
FIG. 2 is a system diagram of a smart window that has an electrochromic window and a window frame with an embedded module in accordance with some embodiments.

FIG. 2 is a system diagram of a smart window 102 that has an electrochromic window 204 and a window frame 202 with an embedded module 206. The embedded module 206 could be positioned at the bottom, top, to one or both sides, or distributed around the window frame 202 in various embodiments. The embedded module 202 has one or more sensors 212, which could include temperature, light, audio/acoustic (i.e., sound), vibration, video or still image, motion, smoke detection, chemical, humidity or other sensors, and which could be facing inwards, i.e., into a room, or outwards, i.e., to the exterior of the room or building, in various embodiments. The wireless interface 128 has an antenna 124, which is used for coupling to the intelligent window controller/driver(s) 104, the command and communication device 106, and/or one or more user devices 136 (e.g., a smart phone, a user wearable device, etc.). A wired interface 130 could also be included, or could be used in place of a wireless interface 128. The control system 114, shown as the first control system 114 in FIG. 1, provides local control for the electrochromic window 204 via the voltage or current driver 208. Alternatively, the control system 114 participates in distributed control. Some embodiments have a rules engine 132 in the module 206. The voltage or current driver 208 sends voltage or current to bus bars of the electrochromic window 204, as directed by one or more of the control systems 114, 116, 118, 120, to control transmissivity of the electrochromic window 204. In some embodiments, to change transmissivity of the electrochromic window 204, the voltage or current driver 208 provides constant current until a sense voltage of the electrochromic window 204 is reached. Then, the voltage or current driver 208 provides a current that maintains the sense voltage at a constant voltage, until a total amount of charge is transferred to the electrochromic window 204 for the new transmissivity level. The embedded module 206 also includes an input device 214, or a user I/O module 142, through which user input can be entered at the smart window 102. In some embodiments, user input can also be entered through the wireless interface 128, e.g., from a smart phone.

Figure 3:
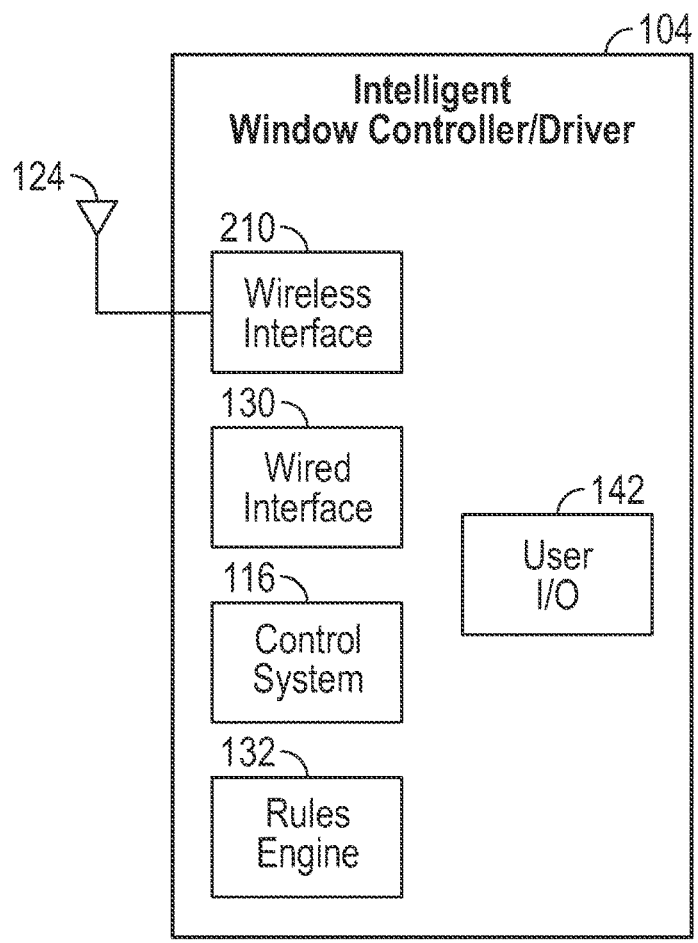
FIG. 3 is a system diagram of an intelligent window controller/driver, from the smart window system of FIG. 1 in accordance with some embodiments.

FIG. 3 is a system diagram of an intelligent window controller/driver 104, from the smart window system of FIG. 1. The intelligent window controller/driver 104 includes a wireless interface 128 with an antenna 124, a wired interface 130, a user I/O module 142, and a control system 116, which is shown as the second control system 116 in FIG. 1. Some embodiments have a rules engine 132. The wireless interface 128 couples to one or more smart windows 102 via the wireless interface 128, as shown in FIG. 1, although the wired interface 130 could be used in further embodiments. Either the wireless interface 128 or the wired interface 130 can be used to couple to the command and communication device 106, in various embodiments. In some embodiments, the wireless interface 128 and/or the wired interface 130 can couple to further devices, such as third-party devices for input information, sensing or control output. For example, the system could control or interact with lighting controllers, HVAC (heating, ventilation and air-conditioning, e.g., by coupling to a thermostat), burglar and/or fire alarm systems, smart phones, or other systems or devices, or receive further input from further sensors, cameras, etc. The user I/O module 142 could include buttons, a touchpad, a touchscreen, a display screen, etc., for user input to the system and/or output from the system. The second control system 116 participates in distributed control with the first control system 114 of the smart window 102, or can override the first control system 114. In some embodiments, the second control system 116 relays direction from the third control system 118 of the command and communication device, or the fourth control system 120 of the server 108, to one or more smart windows 102.

Figure 4:
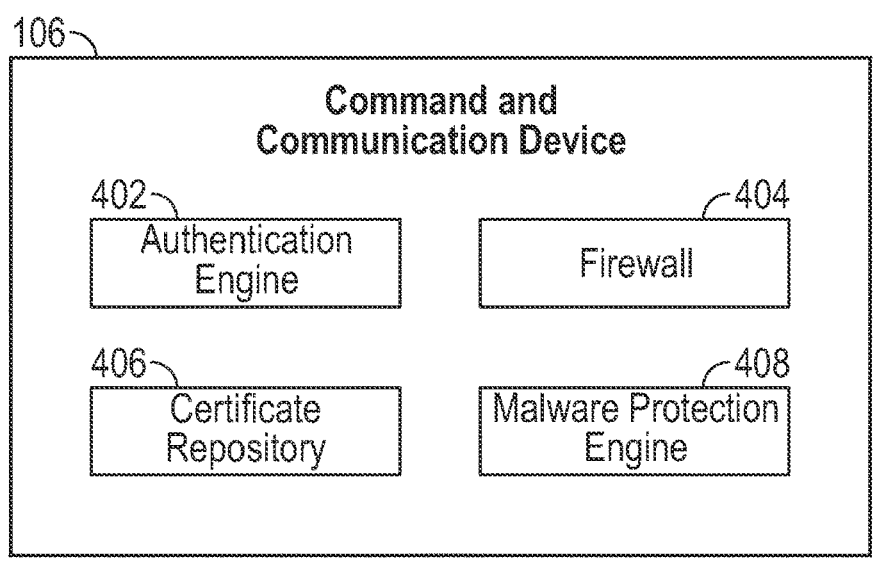
FIG. 4 is a system diagram of a command and communication device, from the smart window system of FIG. 1 in accordance with some embodiments.

FIG. 4 is a system diagram of a command and communication device 106, from the smart window system of FIG. 1. Since the command and communication device 106 is coupled to the network 110, in some embodiments the command and communication device 106 has various protections against unauthorized access. Here, the command and communication device 106 has a firewall 104, a malware protection engine 408, an authentication engine 402, and a certificate repository 406. The firewall 104 is applied in a conventional manner, to communications arriving via the wired interface 130 or the wireless interface 128 (see FIG. 1).

The authentication engine 402 can be applied to authenticate any component that is coupled to or desires to couple to the command and communication device 106. For example, each smart window 102 could be authenticated, each intelligent window controller/driver 104 could be authenticated, and the server 108 could be authenticated, as could any user device 136 or other system 138 attempting to access the smart window system. The command and communication device 106 can authenticate itself, for example to the server 108. To do so, the command and communication device 106 uses a certificate from the certificate repository 406 for an authentication process (e.g., a "handshake") applied by the authentication engine 402.

The malware protection engine 408 can look for malware in any of the communications received by the commanded communication device 106, and block, delete, isolate or otherwise handle suspected malware in a manner similar to how this is done on personal computers, smart phones and the like. Updates, e.g., malware signatures, improved malware detection algorithms, etc., are transferred to the malware protection engine 408 via the network 110, e.g., from the server 108 or one of the other systems 138 such as a malware protection service.

Figure 5:
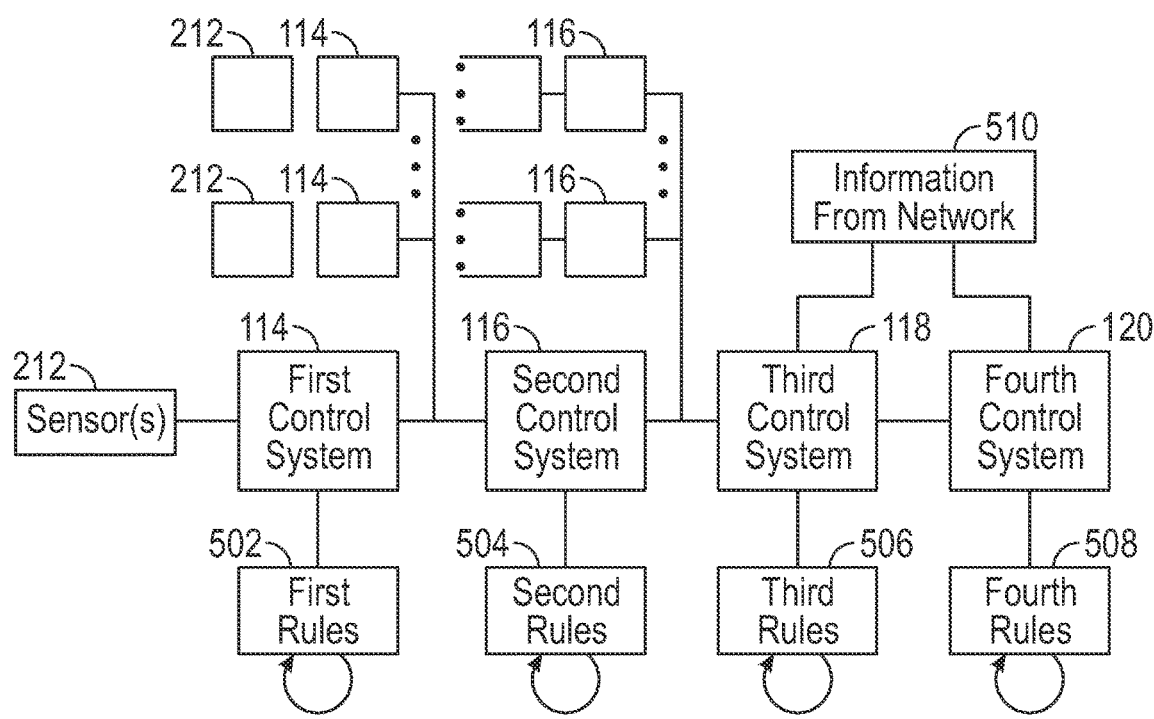
FIG. 5 is a block diagram showing aspects of the distributed device network control system architecture of FIG. 1 in accordance with some embodiments.

FIG. 5 is a block diagram showing aspects of the distributed device network control system architecture of FIG. 1. Although this architecture lends itself to hierarchical control, which is nonetheless possible and can be performed by overrides from components higher up in the chain, it should be appreciated that control is generally distributed across and movable among the first control system(s) 114, the second control system(s) 116, the third control system 118 and the fourth control system 120, i.e., distributed across and movable among the server 108, the command and communication device 106, the intelligent window controller/drivers 104, and the smart windows 102. Smart windows 102 can be operated individually, or in various groups (e.g., facing in a particular direction, or associated with a particular room or group of rooms, or level or floor of a house or other building, subsets or groupings of windows, and so on) using this distributed control architecture. Generally, each control system 114, 116, 118, 120 controls or directs one or more of the smart windows 102, in cooperation with other members of the system. Each control system 114, 116, 118, 120 has respective rules, e.g., the first control system 114 has first rules 502, the second control system has second rules 504, the third control system 118 has third rules 506, the fourth control system 120 has fourth rules 508. Each control system 114, 116, 118, 120 operates according to its local rules, which may incorporate rules distributed from other devices, unless overridden by another device in the system. Rules can include cooperation with other devices, and rules can include instructions allowing for when an override is permissible. For example, an intelligent window controller/driver 104 could override a smart window 102, the command and communication device 106 could override an intelligent window controller/driver 104 or a smart window 102, the server 108 could override the command and communication device 106, an intelligent window controller/driver 104, or a smart window 102, or user input at one of the devices or from a user device 136 could override one or more of these. Information from the sensors 212 of the smart window(s) 102 enters the system through the first control system(s) 114, and can be routed or directed to any of the further control systems 116, 118, 120. Information 510 from the network enters the system through the fourth control system 120, i.e., the server 108, and/or the third control system 118, i.e., the command and communication device 106, and can be routed or directed to any of the further control systems 114, 116. User input can enter the system through the smart windows 102, e.g., through user input at that smart window 102 or wireless user input from a user device 136 to the smart window 102. User input can also enter the system through the intelligent window controller/driver(s) 104, e.g., through user input at the intelligent window controller/driver 104 or wireless user input from a user device 136. User input can enter the system through the third control system 118, e.g., through a wireless coupling from a user device 136 or via the network connection, e.g., from a user device 136. User input can enter the system through the fourth control system 120, e.g., via the server 108. From any of these entry points, the user input can be routed to any of the control systems 114, 116, 118, 120. Each of the control systems 114, 116, 118, 120 can communicate with each other control system 114, 116, 118, 120, and can update respective rules 502, 504, 506, 508 as self-directed or directed by another one or combination of the control systems 114, 116, 118, 120. Control can be cooperative, voted, directed, co-opted, overridden, local, distributed, hierarchical, advisory, absolute, and so on, in various combinations at various times during operation of the system, in various embodiments.

In some embodiments, the smart window system operates the smart windows 102 in a continuous manner, even if there is a network 110 outage (e.g., there is a network outage outside of the building, a server is down, or a wireless router for the building is turned off or fails, etc.). The first control system 114, the second control system 116 and/or the third control system 118 can direct the smart windows 102 without information from the network, under such circumstances. In various combinations, each of the control systems 114, 116, 118, 120 can create, store, share and/or distribute time-bound instructions (e.g., instructions with goals to perform a particular action at or by a particular time), and these time-bound instructions provide continuity of operation even when one or more devices, or a network, has a failure. When the network 110 is available, the third control system 118 obtains weather information from the network, either directly at the third control system 118 or with assistance from the server 108. For example, the third control system 118 could include and apply cloud-based adaptive algorithms. With these, the third control system 118 can then direct operation of the smart windows 102 based on the weather information. One or a combination of the control systems 114, 116, 118, 120 can direct operation of the smart windows 102 based on sensor information, such as from light, image, sound or temperature sensors of the smart windows 102. For example, if the weather information indicates cloud cover, or sensors 212 are picking up lowered light levels, the system could direct an increase in transmissivity of the smart windows 102, to let more natural light in to the building. If the weather information indicates bright sun, or sensors 212 are picking up increased or high light levels, the system could direct a decrease in transmissivity of the smart windows 102, to decrease the amount of natural light let in to the building. The system can modify such direction according to orientation of each window, so that windows pointing away from the incidence of sunlight are directed differently than windows pointing towards incidence of sunlight. If weather information indicates sunlight, and temperature sensors indicate low temperatures, the system could direct increased transmissivity of the smart windows 102, in order to let in more natural light and increase heating of a building interior naturally. In some embodiments, if the temperatures sensors indicate high temperatures, the system could direct decreased transmissivity of the smart windows 102, to block natural light and thereby hold down the heating of the interior of the building by sunlight.

With reference to FIGS. 1-5, some embodiments have a pre-charge function. The pre-charge function is when voltage and/or current is applied to the electrochromic window 204 to cause ions to move in the direction of anticipated change in transmissivity of the electrochromic window 204. A smart window 102 pre-charges the electrochromic window 204, using the voltage or current driver 208, in advance of an upcoming or predicted change of transmissivity of the electrochromic window 204. For example, one or more of the control systems 114, 116, 118, 120 monitor and anticipate user interaction due to motion detection, occupancy detection or other sensor input, and determine that a change of transmissivity of one or more electrochromic windows 204 is about to occur or is likely to occur. This could be accomplished using scheduling, probability modeling, predictive modeling, associative modeling or other modeling and control techniques. The panel is pre-charged a sufficient amount to be not noticeably visible to the human eye upon casual observance, but nonetheless a sufficient amount so as to speed up an actual change of transmissivity when the system determines to do so. This gives the benefit of appearing to switch the transmissivity of the smart window 102 faster, when the user inputs a direction or the system determines to change the transmissivity. If the user does not input a direction to change the transmissivity, or the system determines not to change the transmissivity, one or more of the control systems 114, 116, 118, 120 directs the voltage or current driver 208 to discharge the electrochromic window 204 back to the previous state.

In one embodiment, the system can simulate a fully discharged or fully charged electrochromic window 204, before the charging or discharging has actually completed. For example, if the smart window 102 is going from full tint to clear, clear to full tint, or an intermediate state of transmissivity to clear or full tint, an indicating device could show that the transition is completed or finished, even though the transition is not quite complete in terms of charge transfer. This indication could be shown on a user device 136 (e.g., a mobile device such as a smart phone, tablet, or wearable with an application), a user I/O 142 of a smart window 102, a user I/O 142 of an intelligent window controller/104 (e.g., on a wall mount interface), a user I/O 142 of the command and communication device 106, or other user I/O 142. Timing and charge or discharge levels for when the electrochromic window 204 has a transmissivity level that appears nominally the same as when completely charged or discharged could be determined through device characterization at a factory, lab or installation. Appropriate settings could be made at any of these locations or user adjustable. In a further embodiment, pre-charging can be combined with simulating a fully discharged or discharged electrochromic window 204. The electrochromic window 204 would be pre-charged prior to a planned or predicted transmissivity change. Then, when the transmissivity change is underway, one or more of the user I/O 142 could indicate the electrochromic window 204 has a completed transmissivity change, prior to the voltage or current driver 208 completing the charging or discharging of the electrochromic window 204. The voltage or current driver 208 would then complete the charging or discharging.

Figure 6:
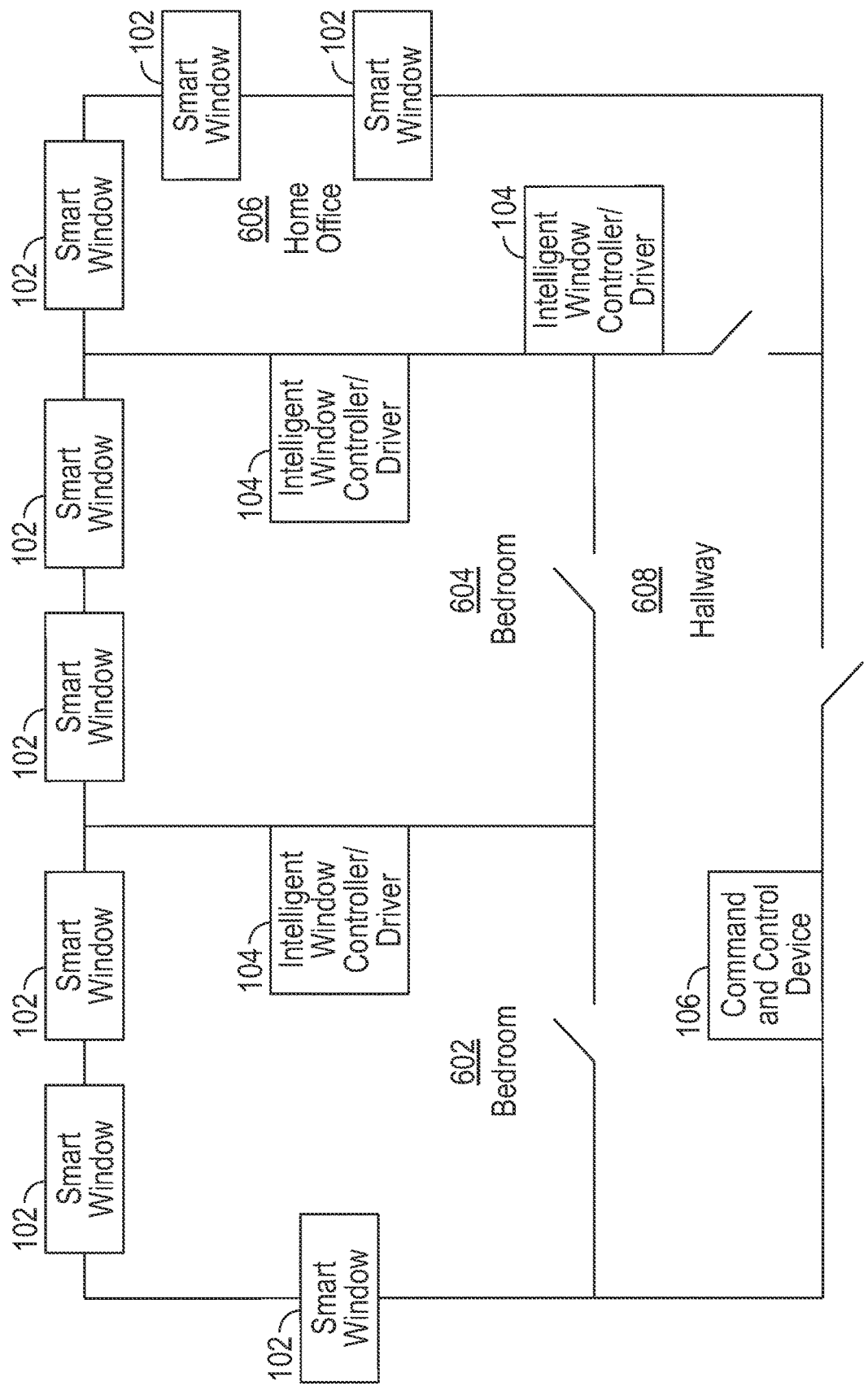
FIG. 6 is a plan view of an example installation of the smart window system of FIG. 1 in accordance with some embodiments.

FIG. 6 is a plan view of an example installation of the smart window system of FIG. 1. This highlights the versatility of installation, and the expandability of embodiments of the system. Further installation examples are readily devised in keeping with the teachings herein. A command and control device 106 is mounted in a hallway 608 of a house or other building, but could be mounted elsewhere. Each of two bedrooms 602, 604 has an intelligent window controller/driver 104 and several smart windows 102. The home office 606 (or, this could be another bedroom, a playroom, the kitchen, a den, etc.) also has an intelligent window controller/driver 104 and several smart windows 102. The intelligent window controller/drivers 104 communicate with the local smart windows 102 and also communicate with the command and control device 106. Further intelligent window controller/drivers 104, and further smart windows 102 are readily added to the system.

When a smart window system is initially installed, the system undergoes a default operation until cloud-connected (i.e., connected to the network 110). In some embodiments, the smart windows 102 are configured with the use of a smart phone application (as further described below with reference to FIGS. 7 and 8), and can be controlled directly from a user device 136, which may be a mobile device such as a smart phone, tablet, or wearable. Once connected to the network 110, the smart window system can tap into sales order data for each smart window 102 and other components of the system. In some embodiments, the system combines factory data with cloud learning (as further described below with reference to FIGS. 9-14), to generate optimal performance operation curves. Profiles are downloadable for new installations or updates to existing installations (as further described below with reference to "recipes" in FIGS. 10 and 11, and environmental models in FIGS. 12 and 13).

Figure 7:
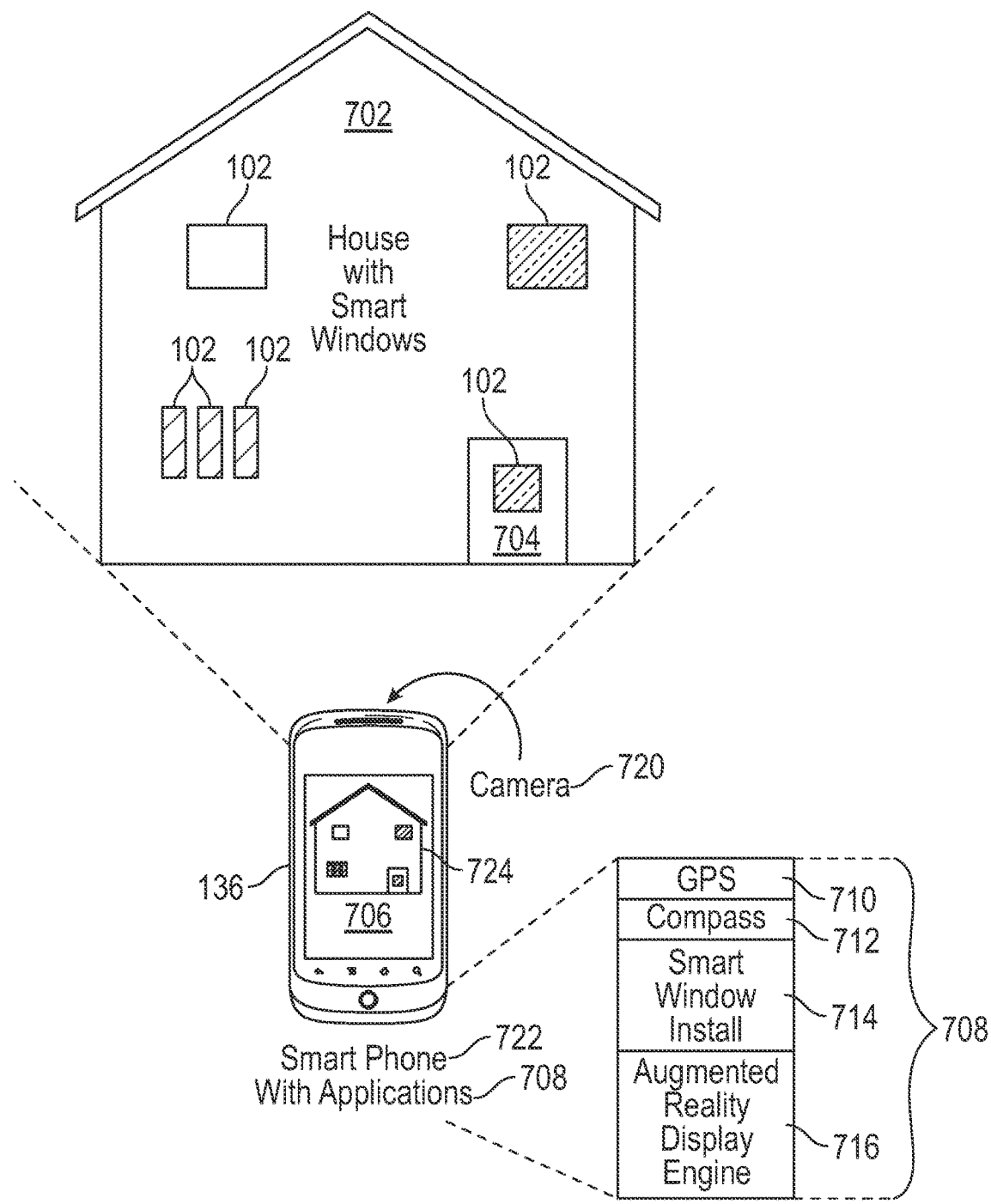
FIG. 7 is a front view of a house with smart windows, and a smart phone with applications relating to the smart window system in accordance with some embodiments.

FIG. 7 is a front view of a house 702 or commercial building, etc., with smart windows 102, and a smart phone 722 with applications 708 relating to the smart window system. It is to be understood that any other user device 136 having capabilities similar to a smart phone could also be used, but this particular embodiment is described using a smart phone. One of the smart windows 102 is on the front door of the house 702, and other smart windows 102 are on the first and second stories of the house 702, in this example. In one scenario, a user is the owner of the house 702 with the smart windows 102, and is using the camera of his or her smart phone 722 or other user device 136 and taking a picture of the house 702. In a related scenario, an installer is using a smart phone 722 or other user device 136, and is taking a picture of the house 702. The smart phone 722 has multiple applications 708 which can assist with installation and usage of the smart windows 102. Further applications 708 are depicted and described with reference to FIG. 8. Still further applications 708 are readily devised in keeping with the teachings herein.

The smart phone 722 is communicating with the smart windows 102 through one of the wireless interfaces 210 of the intelligent window controller/drivers 104, or through the command and communication device 106 (either with a direct wireless connection to it, or through the network 110). A GPS (global positioning system) 710 application provides GPS coordinates for the house 702 to the smart window system. In some embodiments, a compass 712 application provides compass information (i.e., orientation information relative to the magnetic field of the Earth) to the system, and in further embodiments an electronic compass is included among the sensors 212 of the smart windows 102. A smart window install 714 application guides the user or installer through a process of identifying each smart window 102 and entering location and orientation information for that smart window 102 into the system. This identification could be accomplished in various ways. In one scenario, the smart window system lightens or darkens a smart window (i.e., adjusts optical transmissivity to an extreme). The user walks around the house until that smart window 102 is readily identified, and takes a picture using the camera 720 of the smart phone 722, as shown in FIG. 7. The augmented reality display engine 716 identifies the smart window 102 that has been activated by matching a correspondence to a portion of an image 724 of the house 702 that the camera 720 has captured and displayed on the viewscreen 706 of the user device 136. In some embodiments, the user could use a touchscreen of the user device 136 and identify a window by touching part of the captured image 724. Cursor controls of a user device 136 could be used to manipulate a cursor, which is then placed on a portion of the image 724 to identify a smart window 102. Other mechanisms to form a correspondence between a smart window 102 and a depiction of a smart window 102 or other representation of a smart window 102 on a user device 136 are readily devised. For example, after taking a picture of the house 702, the user or installer could enter the building and approach a particular smart window 102, and use an input device of the smart window 102 to identify that smart window 102 as corresponding to a rendering of the smart window 102 on the image 724 captured on the user device 136. Once a particular smart window 102 is identified and a correspondence is established, the user or installer can then enter orientation information, e.g., by placing the smart phone with compass 712 application near or in parallel with the indicated smart window 102, or by manually entering compass or other location information, etc. In some embodiments, the augmented reality display engine 716 can substitute lightened or darkened renderings of smart windows 102 in the captured image 724, to show how the house 702 would appear with various settings of smart windows 102. In some embodiments, the user can select renderings of smart windows 102 by pointing to or touching a portion of the captured image 724, and can then direct a change in transmissivity of the selected smart window 102 or group of smart windows 102 via the user device 136. The above operations could be performed using a captured image 724 from inside the house 702, or from outside the house 702 (as depicted herein).

Figure 8:
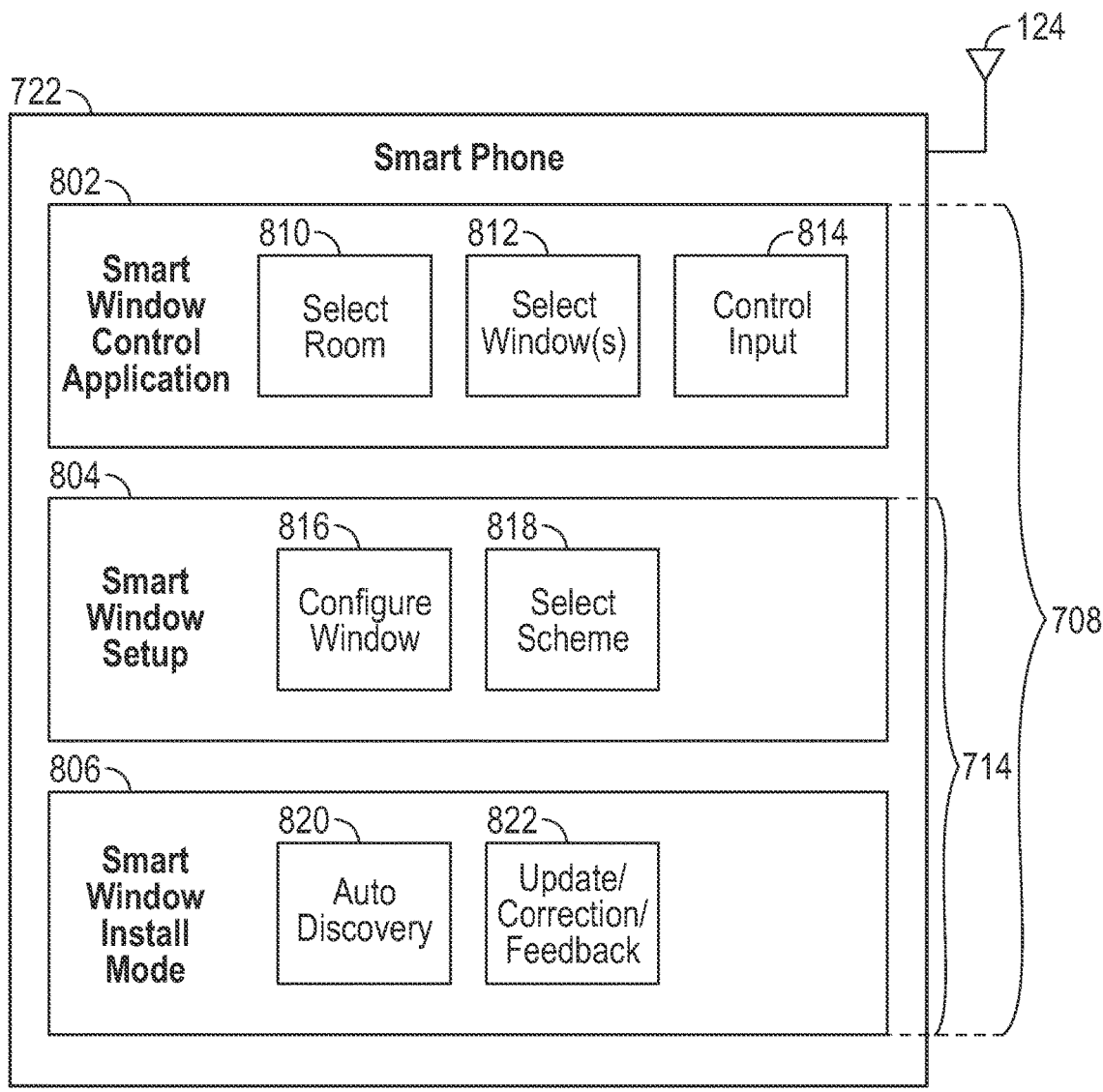
FIG. 8 is a block diagram of applications relating to the smart window system, in a smart phone in accordance with some embodiments.

FIG. 8 is a block diagram of applications 708 relating to the smart window system, in a smart phone 722. The smart window install 714 application 708 has a smart window setup module 804 and a smart window install mode module 806. The system can use an autodiscovery 820 function, in which sensors 212 of the smart windows 102 provide information to the smart window system about orientation of each smart window 102 and connectivity of each smart window 102 to the intelligent window controller/driver(s) 104 and/or the command and communication device 106. There is also an update/correction/feedback 822 function, in which a user or an installer can enter further information, either to correct or augment the information provided with the autodiscovery 820 function, or to manually enter information in a system without autodiscovery 820. These functions are part of the smart window install mode 806 module.

Once the windows are identified to the system, and in supportive embodiments, a correspondence made between each smart window 102 and a captured image 724 of the house 702 (or other building), the user or installer can proceed with the smart window setup 804 module. A configure window 816 function lets the user or installer configure individual windows, groups of windows, or all of the windows. Part of the configuration would be to select a scheme (e.g., a profile), using the select scheme 818 function of the smart window setup 804 module. The system should offer a number of preset schemes from which the user or installer can select, and in further embodiments various schemes can be downloaded from the network 110, e.g., from the server 108 as depicted in FIG. 1.

The user can control the smart windows 102 from a user device such as a smart phone 722. The smart window control application 802 has a select room 810 function, a select window or windows 812 function, and a control input 814 function. By operating these, the user can control individual smart windows 102 or selected groups or all of the smart windows 102. In some embodiments, the user can view a rendering of proposed or actuated settings of transmissivity of smart windows 102, using the viewscreen 706 of the user device 136, and the augmented reality display engine 716 as described above with reference to FIG. 7.

Figure 9:
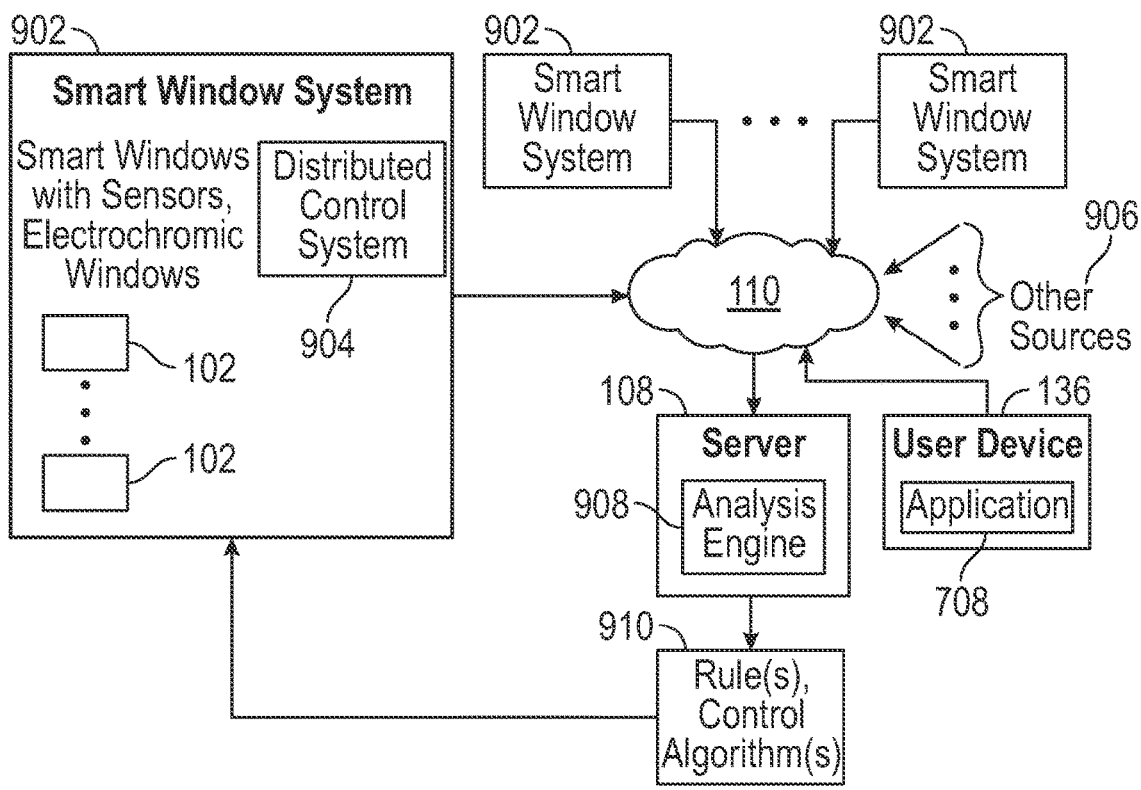
FIG. 9 is a system diagram of the smart window system, with the server of FIG. 1 gathering information for cloud-based adaptive algorithms in accordance with some embodiments.

FIG. 9 is a system diagram of the smart window system 902, with the server 108 of FIG. 1 gathering information for cloud-based adaptive algorithms. The smart window system 902, with smart windows 102, including sensors 212 and electrochromic windows 204 (see FIG. 2) and distributed control system 904 (see architecture in FIG. 4) is coupled via a network 110 to the server 108. Information, e.g., sensor information, usage information, from the distributed control system 904 is sent to the server 108. In some embodiments, the server 108 gathers such information from multiple smart window systems 902, from other sources 906, and from user devices 136. The server 108 could search for weather information, seasonal information, smart window update information, etc. on the network, and receive such information. The server 108 runs this information through an analysis engine 908 and derives rules 910, which may include control algorithms. The server 108 then sends the rules 910 to the smart window system 902. Exchanges, transmissions or updates of rules 910 could include sending and receiving actual rules or portions thereof, such as parameters, information for rules updates, etc. Information gathered by the server 108 can be updated, and the server can use this to update the rules 910 which the server 108 sends to the smart window system 902. In this manner, these rules are adaptive, and cloud-based. In some embodiments, the analysis engine 908 can classify one or more users, e.g., by preferences or early or ongoing usage of a smart window system 902, and make recommendations.

In some embodiments, the system learns favorite settings of individuals, similar to how power seats in some automobiles have presets for individual drivers. This is illustrated in the following scenario, with example users and settings, which should not be seen as limiting in the system and further embodiments. In this example, the smart window system 902 has a few transmissivity settings available for each smart window 102, such as "clear", "light tint", "medium tint" and "dark tint". "Light tint" could mean 30% of full-scale, and in some embodiments, this actual number would not be shown to users. A first user enters the room, selects "light tint", then later decides that the room is not quite dark enough, and adjusts the tint a little bit deeper, for example to 35% of full-scale tinting (although the actual number may not necessarily be shown to users). Since this is a learning system, the smart window system 902 notices the adjustment, and the next time the same user selects "light tint", the system sets the smart window 102 to 35% instead of the original (or perhaps default) 30% tint level. If the same user often selects "light tint" during certain times of day, the system might learn that and said it automatically without user intervention. If the same user often selects "light tint" and adjusts this lighter or darker depending on time of day (and position of sun) or correlating to actual light level in the room (e.g. as measured by a light sensor 212) the smart window system 902 could notice the correlation and adjust transmissivity of the smart window 102 for "light tint" according to the user, time of day and/or natural light level present. The smart window system 902 could create another tint level or levels for "light tint" settings for another user, and apply this when that user is present or commands "light tint". For example, a second user could prefer a "light tint" setting that is a little lighter than the "light tint" setting for the first user. If both users are present and "light tint" is commanded, the system could split the difference between the two customized settings as a starting point, and then over time create further custom settings for the combination of the first user and the second user when both are present. For providing an easy and seamless user experience, the users would never need to know that behind the scenes, the settings are being adjusted as described above, and would not need to know the actual number representation.

Figure 10:
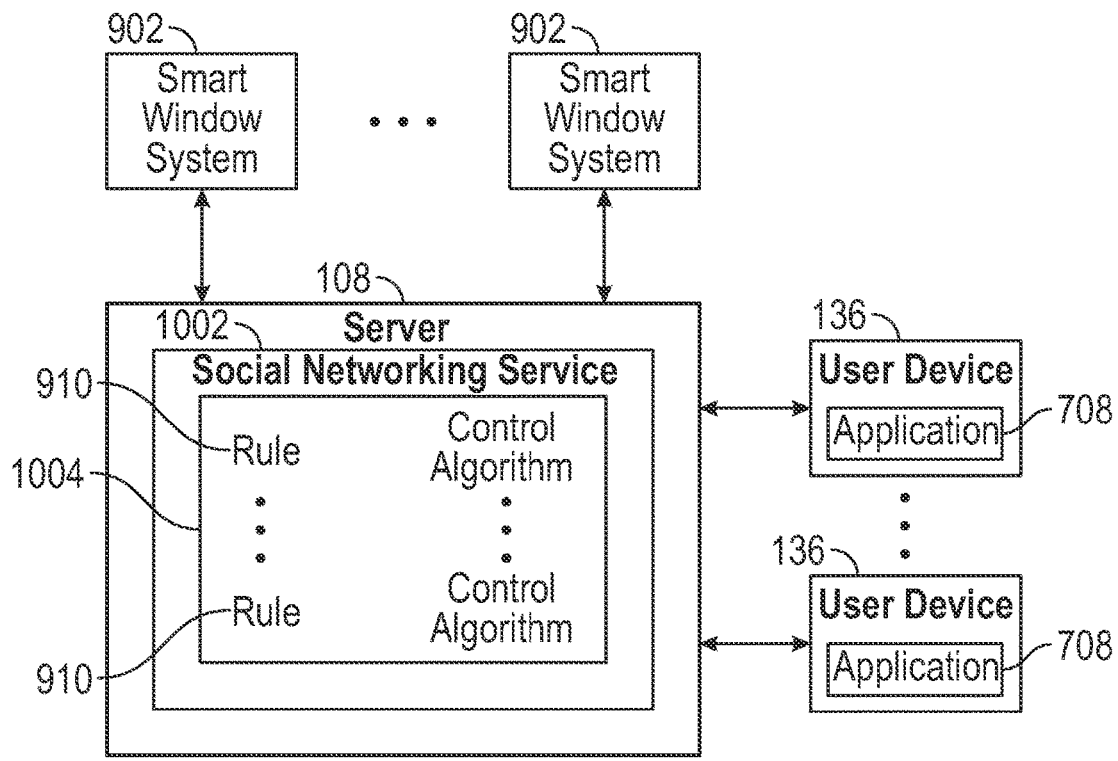
FIG. 10 is a block diagram of the server of FIGS. 1 and 9 hosting a social network service for users of smart window systems in accordance with some embodiments.
Figure 11:
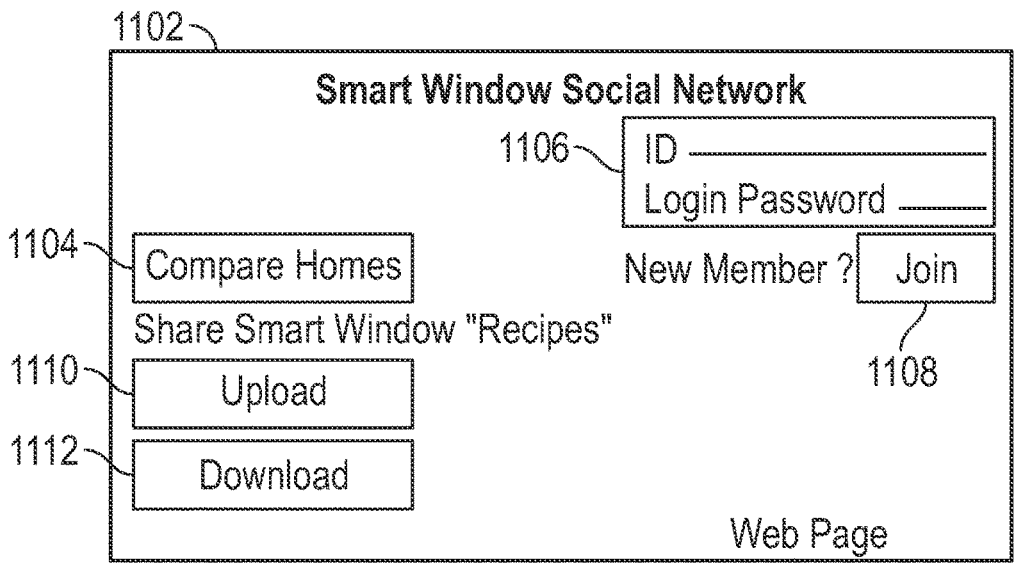
FIG. 11 is an example screenshot of a webpage for a smart window social networking service, which is hosted by the server in FIG. 10 in accordance with some embodiments.

FIG. 10 is a block diagram of the server 108 of FIGS. 1 and 9 hosting a social network service 1002 for users of smart window systems 902. The server 108 can gather information from the smart window systems 902, as depicted in FIG. 9. Users, with user devices 136 and appropriate applications 708, can communicate with the server 108 (e.g., via the network 110, or via the distributed control system 904). Among further aspects, the social networking service 1002 can gather collections 1004 of rules 910, which may contain control algorithms, and offer these for comparison, recommendation or sharing among users of the social networking service 1002. For example, the collections 1004 of rules 910 could be termed "recipes" and kept in a database in or coupled to the server 108. Users can then compare and share such recipes, as shown in FIG. 11. The social networking service 1002 could also make recommendations, for example by using the analysis engine 908, or based on user input such as messages or voting.

FIG. 11 is an example screenshot of a webpage 1102 for a smart window social networking service 1002, which is hosted by the server 108 in FIG. 10. On the webpage 1102, a user has the option of clicking on a login button 1106, and entering a login ID and a login password, or clicking on a join button 1108 as a new member. Once joined or logged in, the user can click on a compare homes button 1104, to see and compare examples of other homes or buildings with smart window systems 902. Smart window recipes are accessible through an upload button 1110 and a download button 1112. For example, the user could try comparing several buildings and viewing how the smart window systems 902 of these buildings are operated, then decide to download some rules 910 (i.e., recipes) to a smart window system 902 owned or operated by the user, based on a system the operation of which the user finds pleasing. The user could upload a recipe of rules 910 for sharing with other users of the smart window social network.

Figure 12:
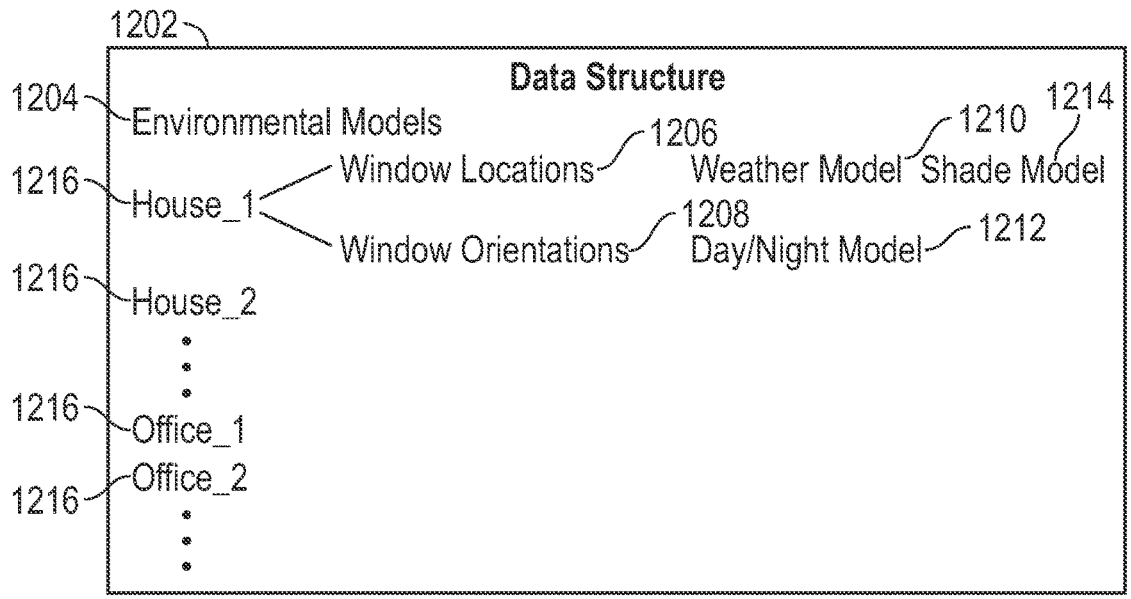
FIG. 12 depicts a data structure for the server of FIGS. 1 and 9, with environmental models for various buildings in accordance with some embodiments.

FIG. 12 depicts a data structure 1202 for the server 108 of FIGS. 1 and 9, with environmental models 1204 for various buildings. This example shows suggested contents of the data structure 1202, but further examples, formats and contents are readily devised in keeping with the teachings herein. There is one environmental model for each building 1216, such as houses or offices. For each building 1216, the environmental model has information about window locations 1206, window orientations 1208, a weather model 1210, a day/night model 1212, and a shade model 1214. For example, the environmental model 1204 of a particular building 1216 named "HOUSE_1" could indicate that one window is located on the second story and facing Southeast, etc., and the weather model is for a temperate region that experiences snow in the winter and relatively hot summers and has weather at that particular day and moment of mixed clouds. The day/night model 1212 is adjusted for latitude and season, and tracks sun angle throughout the day. The shade model 1214 could indicate that the location generally has open lines of sight for sunlight except the west which has trees that shade certain windows at certain times of the day. In various embodiments, the shade model 1214 could be based on user entered information, or could be deduced by the system based on analysis of the day/night model 1212 in comparison with information from the sensors 212 of each of the smart windows 102, or user input (e.g., control overrides), or combinations thereof. For example, if the day/night model 1212 and the weather model 1210 indicate a cloudless day with bright sunshine, but a sensor 212 of a smart window 102 is reporting low light levels, the shade model 1212 could deduce that there is shading on that particular smart window 102 at that time of day relative to that season. In some embodiments, a smart window 102 that is facing away from the prevailing sunlight direction is nonetheless reporting higher light levels from sensors 212, and the shade model 1212 or a glare model could deduce that there is reflected glare incident on the smart window 102. In various versions, the smart window system 902 could deduce the environmental model 1204 for that building 1216, and upload this to the server 108, or the server 108 could deduce the environmental model 1204 for various buildings 1216 and download the appropriate environmental model 1204 to each smart window system 902. Alternatively, the environmental model 1204 could be developed in cooperation between the server 108 and the smart window system 902.

Figure 13:
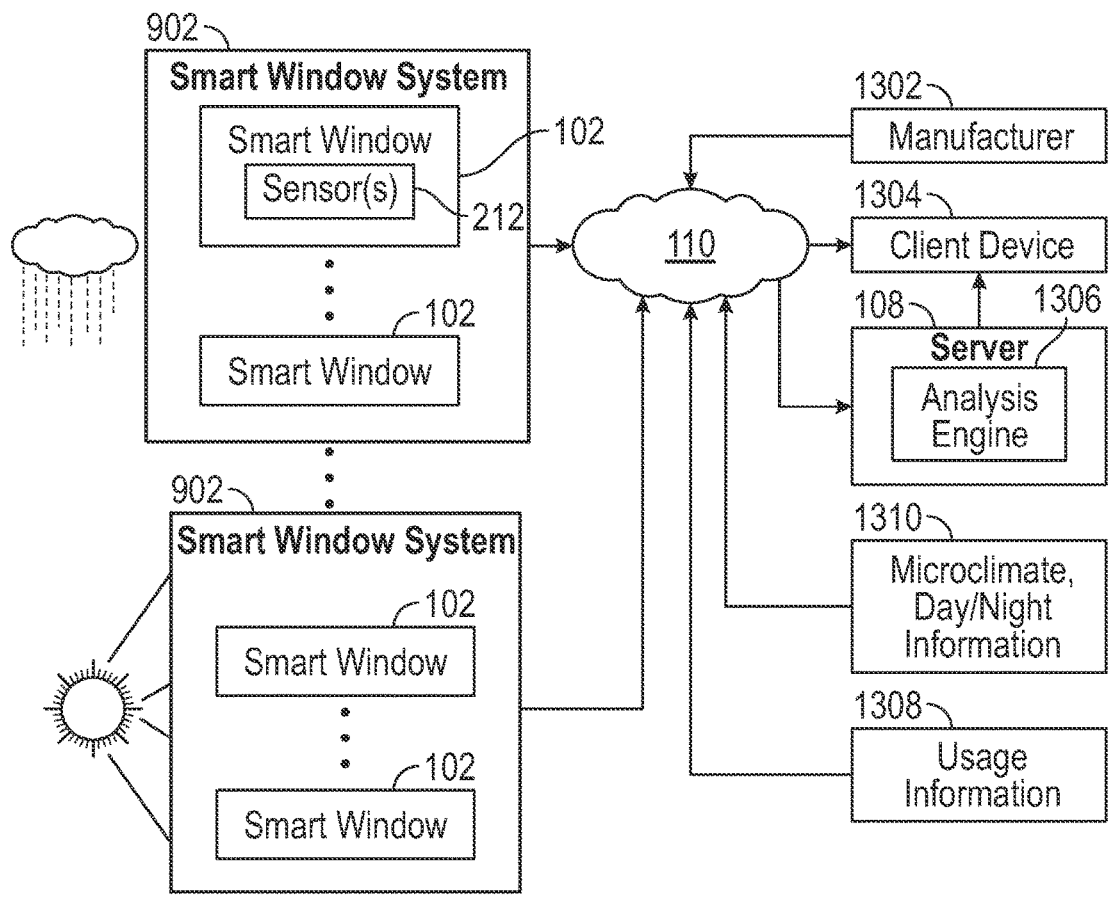
FIG. 13 is a system diagram showing the server of FIGS. 1 and 9 gathering microclimate information from smart window systems, and making the microclimate information available in accordance with some embodiments.

FIG. 13 is a system diagram showing the server 108 of FIGS. 1 and 9 gathering microclimate information 1310 from smart window systems 902, and making the microclimate information available. For example, sensors 212 could detect light levels (e.g., with light sensors or image sensors) and send this information to the server 108. In another example, sensors 212 could detect raindrops impacting on the electrochromic window 204 (e.g., with acoustic sensors, moisture detection sensors externally facing, or image processing) and send this information to the server 108. The analysis engine 1306 in the server 108 could then deduce that the sun is shining on some of the smart windows 102 in some regions, or rain is falling on smart windows 102 in other regions. Sensors could detect temperature and send this information to the server 108. Together with registration information (e.g., divulging the ZIP Code or GPS coordinates of each smart window system 902), the sensor information can be analyzed by the analysis engine 1306 to produce microclimate weather map information specific to regions in which smart window systems 902 are installed and providing microclimate information 1310. For example, the analysis engine 1306 could deduce and map temperature variations, cloud cover, rain patterns, local daylight (e.g., in mountainous regions as compared to more level terrain), etc. More specifically, in some embodiments the analysis engine 1306 generates a probabilistic shade model applicable to a specified number of smart window systems 902, based on information from the smart window systems 902 and cloud cover or other real-time weather information gathered from the network 110, in combination with a geometric model for atmospheric clouds, ground clutter, other building profiles, building shapes, etc. The microclimate weather map information can then be made available to a client device 1304, such as a weather monitoring service that wishes to apply this for subscriber information or forecasting, etc. Users could tap into this information, either through the client device 1304 or through a social networking service 1002 as described with reference to FIG. 10, or other facility or service available through the server 108 or making use of data provided by the server 108. In some embodiments, a suitable fee could be charged for selling the microclimate weather map information, e.g., a subscription fee. With reference back to FIG. 9, the rules 910 sent from the server 108 to a smart window system 902 could be based on the microclimate information.

In some embodiments, usage information 1308 is sent by the smart window systems 902 to the server 108. The server 108 can track the usage information 1308, and relay usage information 1308 or analyzed versions thereof to other parties, for example to a manufacturer 1302. Further analysis is possible from the analysis engine 1306. The analysis engine 1306 could look at user settings and discover that there is a gradual shift in user settings over time, which could indicate aging of the electrochromic windows 204. This could be compared to average or expected data, and could even be tracked on a manufacturing lot basis to see if there are defects or premature aging. Failures could be detected, based on usage information 1308 or sensor information, and the manufacturer 1302 could then take proactive action to repair or replace a smart window 902, or offer upgrades or repairs to out of warranty systems, etc.

As a further embodiment, through cooperation with an electric utility or by looking at utility rates (e.g., in an online bill from an electric utility), the analysis engine 908 of the server 108 could determine electricity usage of a building or a portion of a building that has a smart window system 902. The analysis engine 908 could then make recommendations as to operation of the smart window system 902. For example, on a day with a high temperature (based on information from the sensors 212, or weather information available on the network 110), if high electricity usage is detected, the analysis engine 908 could recommend low transmissivity settings for some or all of the smart windows 902, in order to introduce more shade to the interior of the building and reduce air-conditioning costs. The recommendation could come in the form of a rule that is downloaded to the smart window system 902. The smart windows 102 would then be operated according to that rule, and would reduce transmissivity accordingly. The rule could be time-bound, e.g., valid for a specified time span, or open-ended, e.g., good until canceled, overridden or modified.

Figure 14:
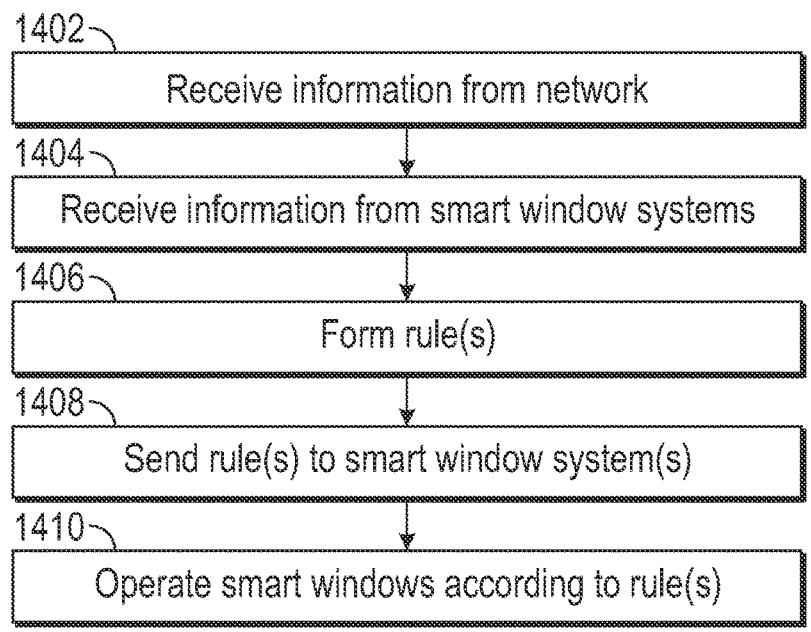
FIG. 14 is a flow diagram of a method for operating a smart window system with cloud learning in accordance with some embodiments.

FIG. 14 is a flow diagram of a method for operating a smart window system with cloud learning. The method can be practiced on or by a processor, for example a processor in a server in embodiments of the smart window system. In an action 1402, information relevant to operation of smart window systems is received from a network. For example, a server that coordinates with one or more smart window systems could search for weather information, seasonal information, smart window update information, etc. on the network, and receive such information. In an action 1404, information from smart window systems is received. For example, the server could receive sensor information, information about user settings and system usage, etc. from one or more smart window systems. In an action 1406, one or more rules are formed. An analytical engine in the server could form rules that have, include, or are derived from cloud-based adaptive algorithms. In an action 1408, a rule or rules so formed are sent to one or more smart window systems. In an action 1410, the smart windows are operated according to the rule or rules. Further embodiments of the above method have provisions for updating rules, revising rules, modifying rules, sharing rules, etc.

Figure 15:
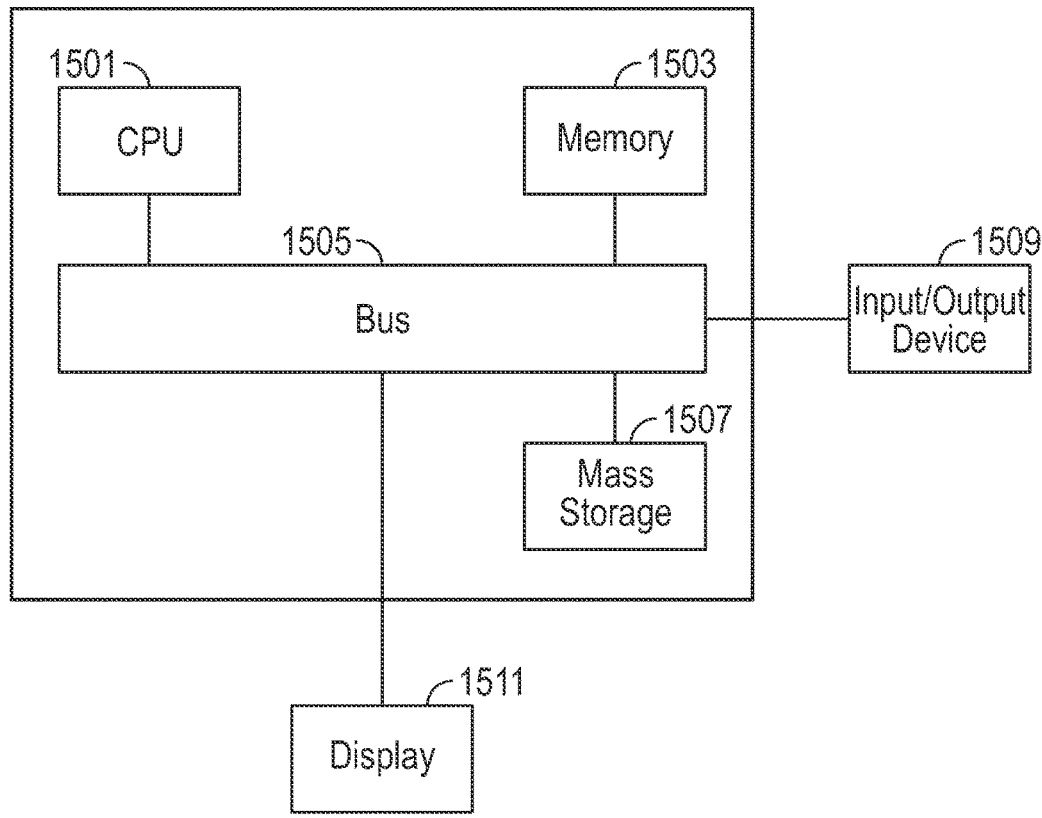
FIG. 15 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 15 is an illustration showing an exemplary computing device which may implement the embodiments described herein. The computing device of FIG. 15 may be used to perform embodiments of the functionality for controlling smart windows in accordance with some embodiments. The computing device includes a central processing unit (CPU) 1501, which is coupled through a bus 1505 to a memory 1503, and mass storage device 1507. Mass storage device 1507 represents a persistent data storage device such as a floppy disc drive or a fixed disc drive, which may be local or remote in some embodiments. Memory 1503 may include read only memory, random access memory, etc. Applications resident on the computing device may be stored on or accessed via a computer readable medium such as memory 1503 or mass storage device 1507 in some embodiments. Applications may also be in the form of modulated electronic signals modulated accessed via a network modem or other network interface of the computing device. It should be appreciated that CPU 1501 may be embodied in a general-purpose processor, a special purpose processor, or a specially programmed logic device in some embodiments.

Display 1511 is in communication with CPU 1501, memory 1503, and mass storage device 1507, through bus 1505. Display 1511 is configured to display any visualization tools or reports associated with the system described herein. Input/output device 1509 is coupled to bus 1505 in order to communicate information in command selections to CPU 1501. It should be appreciated that data to and from external devices may be communicated through the input/output device 1509. CPU 1501 can be defined to execute the functionality described herein to enable the functionality described with reference to FIGS. 1-14. The code embodying this functionality may be stored within memory 1503 or mass storage device 1507 for execution by a processor such as CPU 1501 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A cloud learning system for smart windows, comprising:
    at least one server configured to couple via a network to a plurality of window systems, each of the plurality of window systems associated with multiple control systems arranged in an hierarchical order each of the plurality of window systems having at least one electrochromic window and sensor, the multiple control systems including a first control system local to each window of a window system, the first control system comprising:
        a power supply control module configurable to supply a constant current from a power supply to the at least one electrochromic window, and to stop the supplying of the constant current to the at least one electrochromic window when a sense voltage of the at least one electrochromic window attains a sense voltage limit;
    the at least one server configured to gather first information from the plurality of window systems, and configured to gather second information from sources on the network and external to the plurality of window systems;
    the at least one server configured to form at least one rule or control algorithm usable by a window system, based on the first information and the second information, and configured to download the at least one rule or control algorithm to at least one of the plurality of window systems; and
    the at least one server configured to generate a probabilistic shade model applicable to the plurality of window systems, based on the first information and based on the second information including weather information regarding cloud cover, and based on a geometric model associated with atmospheric clouds, ground clutter, building shapes, and building profiles.

2. The cloud learning system for smart windows of claim 1, further comprising:
    the at least one server configured to determine microclimate weather information from the first information, with the microclimate weather information accessible via a network connection to the at least one server.

3. The cloud learning system for smart windows of claim 1, further comprising:
    the at least one server configured to host a social network based on the plurality of window systems; and
    the at least one server configured to collect and offer access to a plurality of rules or control algorithms from or for the plurality of window systems, as a function for the social network.

4. The cloud learning system for smart windows of claim 1, further comprising:
    the at least one server configured to identify manufacturing or aging variances in the plurality of windows of the plurality of window systems based on use of the first information over a span of time.

5. The cloud learning system for smart windows of claim 1, further comprising:
    the at least one server configured to compare operations, control algorithms or rules of differing ones of the plurality of window systems and configured to derive a recommended operation, control algorithm or rule for one of the plurality of window systems based on such a comparison.

6. The cloud learning system for smart windows of claim 1, further comprising:
the at least one server configured to determine a classification of a user of one of the plurality of window systems, based on the first information; and
the at least one server configured to determine a recommended operation, control algorithm or rule for the one of the plurality of window systems based on the classification of the user.

7. A method for operating a smart window system with cloud learning, comprising:
receiving, at at least one server, information from a plurality of window systems and information available on a network external to the plurality of window systems;
forming, at the at least one server, at least one rule or control algorithm usable by a window system, based on the information from the plurality of window systems and the information available on the network;
sending, from the at least one server to a window system of the plurality of window systems, the at least one rule or control algorithm;
adjusting transmissivity of at least one of a plurality of windows of the window system, based on the at least one rule or control algorithm; and
generating a probabilistic shade model applicable to the plurality of window systems, based on the first information and based on the second information including weather information regarding cloud cover, and based on a geometric model associated with atmospheric clouds, ground clutter, building shapes, and building profiles.

8. The method of claim 7, further comprising:
determining electricity usage of a building or portion of a building having the window system, based on information from an electric utility, wherein the at least one rule or control algorithm is based on the electricity usage and wherein the at least one rule or control algorithm limits transmissivity of at least a subset of the plurality of smart windows in the building or portion of the building.

9. The method of claim 7, further comprising:
co-operating the at least one server and at least one application on at least one user device to share a collection of rules or control algorithms applicable to window systems.

10. The method of claim 7, further comprising:
providing information from sensors of windows of the window system and further window systems to a weather forecasting service or server.

11. The method of claim 7, further comprising:
generating an environmental model for each of the plurality of windows of the window system, based on information from at least one sensor of each of the plurality of windows and based on the information from the network including weather and daylight information, wherein the environmental model includes a shade model and wherein the at least one rule or control algorithm is based on the environmental model.

12. The method of claim 7, further comprising:
revising the at least one rule or control algorithm at the at least one server or at the window system, responsive to further information, wherein the smart window system with cloud learning is adaptive.

* * * * *